United States Patent [19]

Kunz

[11] 4,370,970
[45] Feb. 1, 1983

[54] APPARATUS FOR SUPPLYING A FUEL/AIR MIXTURE TO AN INTERNAL COMBUSTION ENGINE

[76] Inventor: Paul R. Kunz, Bern, Id. 83220

[21] Appl. No.: 112,351

[22] Filed: Jan. 15, 1980

[51] Int. Cl.³ .......................................... F02M 31/00
[52] U.S. Cl. .................... 123/557; 123/523; 261/144
[58] Field of Search ............... 123/557, 558, 556, 522, 123/523, 552, 585, 587, 555; 261/144, DIG. 83

[56] References Cited

U.S. PATENT DOCUMENTS

| | | | |
|---|---|---|---|
| 474,838 | 5/1892 | Lambert | 123/522 |
| 857,730 | 6/1907 | Goodspeed . | |
| 858,046 | 6/1907 | Westendarp . | |
| 961,152 | 6/1910 | Morse . | |
| 1,267,185 | 5/1918 | Coffman . | |
| 1,453,187 | 4/1923 | Rumford | 123/557 |
| 1,530,882 | 3/1925 | Chapin | 123/522 |
| 1,679,279 | 7/1928 | Swartz | 123/522 |
| 2,461,411 | 2/1949 | Cummings | 123/556 |
| 2,742,886 | 4/1956 | McPherson | 123/522 |
| 3,447,511 | 1/1969 | Beard . | |
| 3,659,575 | 5/1972 | Lokka | 123/587 |
| 3,667,436 | 6/1972 | Reichleln . | |
| 3,713,429 | 1/1973 | Dwyre | 123/552 |
| 3,738,334 | 6/1973 | Farr | 123/557 |
| 3,800,533 | 4/1974 | Zankowski | 123/522 |
| 3,911,881 | 10/1975 | Lee, Jr. . | |
| 3,931,801 | 1/1976 | Rose . | |
| 3,957,024 | 5/1976 | Mills . | |
| 3,986,486 | 10/1976 | Rabbiosi | 123/557 |
| 3,987,773 | 10/1976 | Harrob . | |
| 4,003,356 | 1/1977 | Naylor . | |
| 4,015,569 | 4/1977 | Leshner . | |
| 4,099,499 | 7/1978 | Giardini . | |
| 4,267,802 | 5/1981 | Garetson | 123/557 |

FOREIGN PATENT DOCUMENTS 576794  2/1924  France ........................ 123/555

Primary Examiner—Ronald H. Lazarus
Attorney, Agent, or Firm—Schwartz, Jeffery, Schwaab, Mack, Blumenthal & Koch

[57] ABSTRACT

Apparatus for producing a combustible fuel/air mixture in which the fuel is completely vaporized for operating an internal combustion engine. Exhaust gases from the engine (40) pass through a heating manifold (8) in a vaporization chamber (2) to raise the temperature of a body of volatile liquid fuel in the bottom of the chamber. An air stream is also heated by passing it in heat exchange relation with hot exhaust gases from the engine. The stream of heated air is then drawn through an enclosed vapor space (6) at the top of the vaporization chamber, and fuel vapors are entrained therein. The fuel vapor-containing air stream is then mixed with additional air in a mixing chamber (26) to produce a combustible fuel/air mixture which is conveyed to the intake manifold (38) of the engine. Safety screens (64) are provided to prevent entry of sparks or flame into the fuel chamber.

24 Claims, 1 Drawing Figure

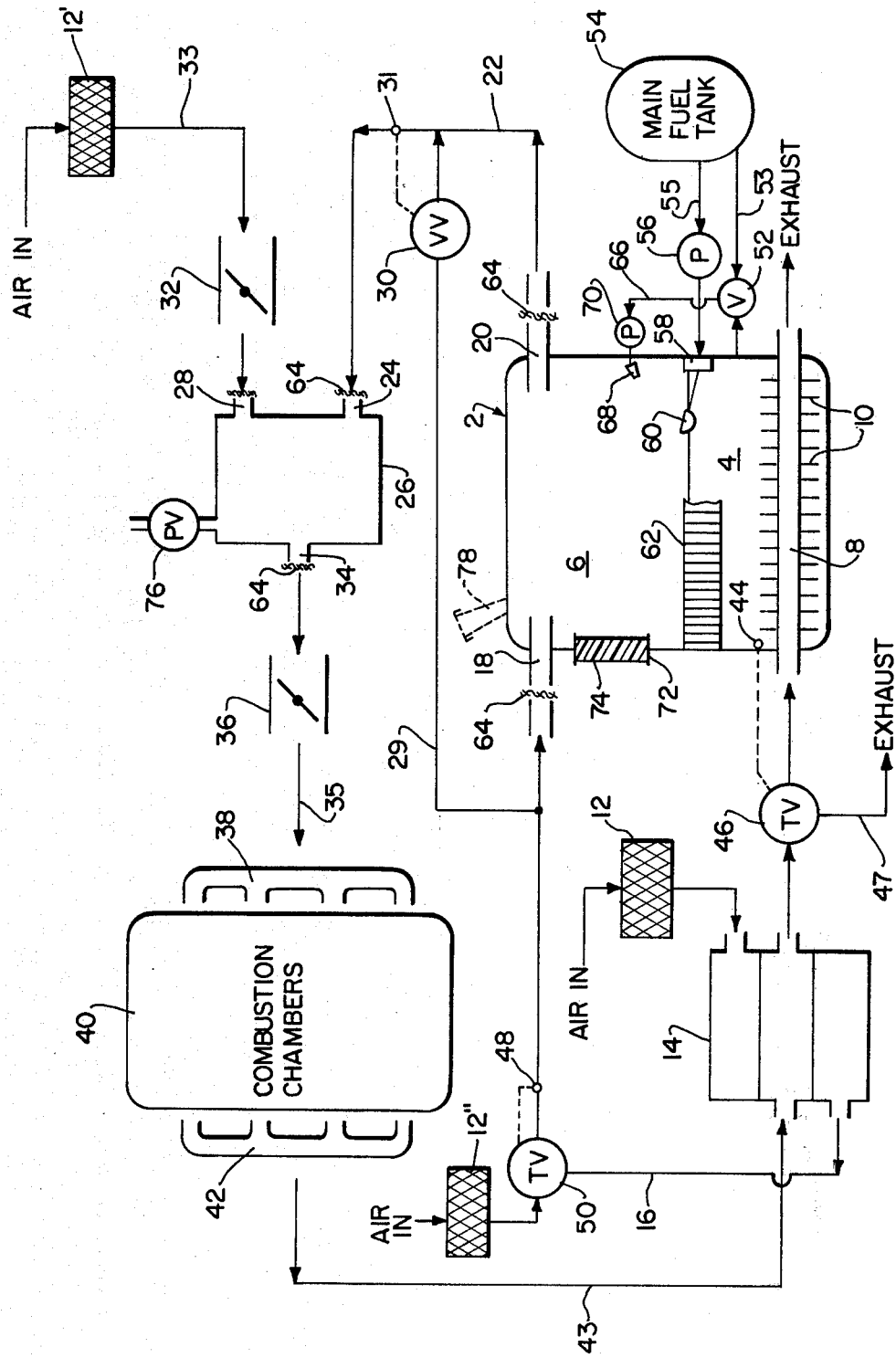

APPARATUS FOR SUPPLYING A FUEL/AIR MIXTURE TO AN INTERNAL COMBUSTION ENGINE

BACKGROUND OF THE INVENTION

1. Field of the Invention

This invention relates to apparatus for producing fuel/air mixtures for internal combustion engines. More particularly, the present invention relates to apparatus in which the heat of exhaust gases from the engine is utilized in an efficient manner to completely vaporize the fuel, thereby enabling production of an efficiently burning fuel/air mixture.

2. Description of the Prior Art

In a conventional carburetor, a stream of gasoline is aspirated into a draft of air in a venturi where it is dispersed into a mist of fine droplets. Despite years of development, the conventional carburetor is comparatively inefficient. Theoretically, the droplets vaporize to produce a gaseous fuel/air mixture. In actual practice, vaporization is often incomplete with the result that combustion is also incomplete, and unburned hydrocarbons pass into the exhaust and are wasted.

Numerous attempts have been made to develop alternative systems for producing fuel/air mixtures in which complete volatilization will be achieved. It has been proposed to use the heat of the exhaust gases from the engine to promote vaporization. For example see Giardini, et. al., U.S. Pat. No. 4,099,499; Goodspeed, U.S. Pat. No. 857,730; and Coffman, U.S. Pat. No. 1,267,185, in which the fuel line is passed through the exhaust conduit in order that the heat of the exhaust gases may promote vaporization. Rose, U.S. Pat. No. 3,931,801, and Reichhelm, U.S. Pat. No. 3,667,436, disclose systems in which the hot exhaust gases are passed into direct contact with the fuel in order to promote vaporization. In the system of Reichhelm, the hot exhaust gases are also passed into contact with the exterior of the gasification chamber and preheated air may optionally be passed through the gasification chamber in order to cleanse the chamber. Leshner, et al., U.S. Pat. No. 4,015,569, discloses a system in which volatile liquid fuel is passed through a chamber located in the exhaust conduit of an internal combustion engine and vaporized by the heat of the exhaust gas after which the fumes are mixed with combustion air and fed to the engine.

Lee, U.S. Pat. No. 3,911,881, discloses a system in which a fuel/air mixture from a carburetor is passed through a vaporization chamber which is heated by passing hot exhaust gases through an adjoining chamber. Harrow, et. al., U.S. Pat. No. 3,987,773, and Mills, U.S. Pat. No. 3,957,024, disclose systems in which a heat transfer fluid is used to convey heat from the hot exhaust gases to vaporize a liquid fuel in a stream of combustion air. Naylor, U.S. Pat. No. 4,003,356, discloses a system for vaporizing a liquid motor fuel in an air-free environment by passing it in heat exchange relation with the hot water from the engine cooling system. Beard, U.S. Pat. No. 3,447,511, teaches the use of heat from exhaust gases to generate fuel from crude oil. Morse, U.S. Pat. No. 961,152, and Westendarp, U.S. Pat. No. 858,046, disclose vaporization of heavy hydrocarbons, such as kerosene, by passing them in heat exchange relation with hot exhaust gases after which the fuel vapors are mixed with combustion air.

Despite the extensive efforts of the prior art to find a substitute for the conventional carburetor, conventional carburetors today remain the principal means utilized to produce fuel/air mixtures for internal combustion engines, notwithstanding all of the known disadvantages of such carburetors.

OBJECTS OF THE INVENTION

Accordingly, it is an object of the present invention to provide apparatus to replace the conventional carburetor.

Another object of the present invention is to provide apparatus for producing a fuel/air mixture in which the fuel is completely vaporized.

A further object of the present invention is to provide apparatus which will increase the efficiency and economy of operation of internal combustion engines.

Another object of the present invention is to provide apparatus for producing a fuel/air mixture which is useful in stationary and in mobile engines.

SUMMARY OF THE INVENTION

These and other objects of the invention are achieved by providing apparatus for supplying a fuel/air mixture to an internal combustion engine comprising a fuel chamber comprising a lower portion for containing a body of volatile liquid fuel and an upper portion defining an enclosed vapor space above said body of liquid fuel; heating manifold means extending through said lower chamber portion for conducting hot exhaust gases therethrough in order to heat a body of volatile liquid fuel therein; means for drawing an air stream through said enclosed vapor space and entraining fuel vapors in said air stream; means for passing said air stream in heat exchange relation with hot exhaust gases to raise the temperature of the air stream prior to drawing the air stream through said vapor space; means for mixing said fuel vapor-containing air stream with additional air to produce a combustible fuel/air mixture; means for conveying said combustible fuel/air mixture to a combustion chamber of an internal combustion engine; and means for preventing entry of sparks or flame into said enclosed vapor space.

BRIEF DESCRIPTION OF THE DRAWINGS

The invention will be explained in further detail with reference to the accompanying drawing which is a schematic representation of the apparatus of the invention.

DETAILED DESCRIPTION OF A PREFERRED EMBODIMENT

The accompanying FIGURE illustrates schematically apparatus for producing a combustible fuel/air mixture for an internal combustion engine according to the present invention. A fuel chamber 2 is provided comprising a lower portion 4 for containing a body of volatile liquid fuel, such as gasoline, and an upper portion 6 defining an enclosed vapor space. The walls of the fuel chamber must be sufficiently rigid to withstand a slight negative pressure, i.e., a pressure less than atmospheric, in the interior of the chamber. A heating manifold 8 extends through the lower chamber portion 4 such that a body of liquid fuel therein will be in contact with the exterior of the manifold. Hot exhaust gases are passed through manifold 8, and heat from the gases is transferred to the liquid fuel, thereby raising the temperature and the tendency of the fuel to evaporate, i.e., the vapor pressure of the fuel. If desired, fins 10 may be provided on manifold 8 in order to promote the transfer of heat between the manifold and the surrounding fuel. In larger fuel tanks or chambers, the heating manifold may advantageously take the form of a network of parallel conduits, rather than a single conduit as illustrated in the drawing. This arrangement facilitates more effective heat transfer to the body of liquid fuel.

In response to the motion of the engine, a stream of air is drawn through air filter 12 to a heat exchanger 14. In exchanger 14, the temperature of the air is raised by passing it in heat exchange relation with a hot exhaust gas stream. The hot air stream passes through line 16 and enters vapor space 6 through inlet 18. The air stream there mixes with fuel vapors produced by the combined action of the hot exhaust gas stream passing through heating manifold 8 and the hot air stream. The fuel vapor-containing air stream exits from vapor space 6 through outlet 20. The fuel vapor-containing air stream is conveyed through line 22 to inlet 24 of a mixing chamber 26. Simultaneously, a stream of supplemental air is drawn through air cleaner 12' and line 33 and enters mixing chamber 26 through inlet 28. The fuel vapor-containing air stream entering through inlet 24 and the additional air stream entering through inlet 28 are intimately admixed as they pass through the mixing chamber. The amount of air entering the mixing chamber through inlet 28 from line 33 is controlled by throttle valve 32. This may be a manually controlled valve or it may be automatically controlled in the known fashion in response to engine operating conditions. By adjusting throttle valve 32, the proportions of air and fuel vapor in the ultimate mixture exiting mixing chamber 26 through outlet 34 can be controlled. Closing valve 32 will produce a fuel-rich mixture and opening valve 32 will produce a lean fuel/air mixture.

The combustible fuel/air mixture then passes through line 35 and throttle valve 36 to the intake manifold 38 which in turn leads to the combustion chambers of internal combustion engine 40. The fuel/air mixture is burned in the combustion chambers to drive the engine. Hot exhaust gases left after the fuel/air mixture has been combusted are forced out of the combustion chambers through exhaust manifold 42. The hot exhaust gases are conveyed from the exhaust manifold via line 43 to exchanger 14 where they are passed in heat exchange relation with an air stream in order to heat the air stream as previously described. After leaving exchanger 14, the hot exhaust gases then pass through heating manifold 8 where they serve as previously described to heat a body of liquid fuel in the lower chamber portion 4. After passing through heating manifold 8, the exhaust gases are discharged to polution control systems and/or muffler systems (not shown) as desired.

The apparatus of the invention additionally may comprise means for selectively permitting a portion of the hot air stream to bypass the fuel vaporization chamber. In the illustrated embodiment, such means comprise a bypass line 29 extending between fuel chamber inlet line 16 and chamber outlet line 22. A vacuum-operated valve 30 is provided on line 29 and an associated pressure sensor is disposed in line 22. As the speed of engine 40 is increased, the negative pressure or vacuum in line 22 also increases. This is detected by sensor 31 which causes valve 30 to open, thereby allowing hot air from line 16 to bypass the fuel chamber through line 29, automatically producing a leaner fuel/air mixture and improving operating efficiency when the engine is accelerated.

If desired, to control the temperature of the body of liquid fuel in lower chamber portion 4, a temperature sensor 44 may be provided in lower chamber portion 4 so as to be in contact with the body of liquid fuel. The measured temperature determined by sensor 44 is transmitted to a thermal valve 46 interposed between heat exchanger 14 and heating manifold 8. Valve 46 acts in response to the measured temperature value to apportion the flow of hot exhaust gas between heating manifold 8 and a diversion conduit 47. Initially, when the body of liquid fuel in lower chamber portion 4 is cold, all of the exhaust gases are passed through heating manifold 8. As the temperature of the liquid fuel approaches the desired value, a portion of the hot exhaust gases will be diverted away from heating manifold 8. If the temperature of the liquid fuel becomes too great, all of the exhaust gases will be channeled through diversion conduit 47. In this way, the temperature of the liquid fuel in the fuel chamber can be automatically controlled. Desirably, when the fuel is gasoline, the temperature of the liquid fuel will be maintained between about 70° F. and about 95° F., preferably between about 80° F. and about 85° F. Somewhat higher temperatures may be required for less volatile fuels, such as diesel fuel.

A second temperature sensor 48 is interposed in line 16 in the path of the hot air stream between heat exchanger 14 and fuel chamber inlet 18 so as to measure the temperature of the air stream. The measured temperature value is transmitted to a thermally responsive valve 50. Ambient temperature air from air cleaner 12" may also be introduced into line 16 through valve 50. This valve acts in response to the measured temperature to apportion the mix of heated air from the exchanger and ambient air from the air cleaner. When the engine is first started, all of the air drawn into the fuel chamber comes from the heat exchanger in order to provide a hot air stream as soon as possible. As the temperature of the air stream reaches the desired level, valve 50 will open to admit a portion of ambient temperature air from the air cleaner to line 16 to maintain the proper temperature. When gasoline is utilized as the volatile liquid fuel, the temperature of the air stream will desirably be maintained between about 70° F. and about 105° F., preferably between about 75° F. and about 90° F. If the temperature of the air stream starts to exceed about 110° F., the flow of air from the heat exchanger will be cut off and all of the air entering the fuel chamber will be drawn through air cleaner 12". It has been found that, when the temperature of the air stream exceeds about 110° to 120° F., the more volatile components of the fuel are rapidly stripped away leaving an oily residue which remains in the fuel chamber.

As fuel from the body of liquid fuel in lower chamber portion 4 is evaporated and drawn off with the hot air stream, replacement fuel is provided from a main fuel tank 54 through fuel supply line 55 by means of a pump 56. A needle valve 58 operated by a float 60 serves to maintain a constant fuel level in lower chamber portion 4.

In stationary installations, the fuel chamber may serve as the main fuel tank of the system. In such a case, fuel tank 54, line 55, pump 56, valve 58 and float 60 are eliminated and replaced by a fill spout 78, shown in dotted lines at the top of fuel chamber 2.

In mobile installations, means are provided to prevent sloshing of the fuel in lower chamber portion 4. Such means may take the form of a network of baffles which divide the surface of the body of liquid fuel into a large number of small areas. A preferred slosh-preventing means comprises a honeycomb matrix 62 providing a plurality of vertically-oriented, hexagonal channels with open upper and lower faces. Matrix 62 is positioned inside fuel chamber 2 so that its upper surface is substantially even with or slightly above the surface of the body of liquid fuel. A portion of the matrix may be cut out to permit free operation of float 60. For convenience in illustration, the matrix is shown extending only part way across the fuel chamber, but it is understood that in actual operation, the matrix will extend across as much of the surface of the body of liquid as possible. The anti-slosh baffle matrix is ordinarily unnecessary in stationary installations.

It may also be noted that air stream inlet 18 and outlet 20 extend inwardly of the wall of fuel chamber 2. This arrangement prevents any fuel which may slosh upwardly along the wall of the fuel chamber, due to extreme motion of the vehicle, from passing into the inlet or outlet. In the drawing, inlet 18 and outlet 20 are shown aligned with each other in opposite walls of the fuel chamber, but it should be understood that they may be positioned in various locations and at varying angles to accommodate installation requirements. The principal requirement to be kept in mind is that they should be positioned so that the stream of air passing through the fuel chamber will not entrain droplets of unvaporized fuel. Ordinarily, this may be accomplished by positioning the inlet and outlet several inches above the level of the fuel. A distance of 3 to 4 inches has been found satisfactory in most instances.

Fuel chamber inlet 18 and outlet 20 are covered by fine mesh metal screens 64. These screen members serve as spark barriers to prevent sparks or flames from entering the fuel chamber 2. Similar barrier screens may be provided at inlets 24 and 28 and outlet 34 of mixing chamber 26. The use of such barrier screens substantially reduces explosion hazards.

The apparatus of the invention also contains auxiliary vaporization means which are used to cold-start the engine. The auxiliary vaporization means comprises a fuel circulation line 66 communicating between the body of the liquid fuel in lower chamber portion 4 and a spray nozzle 68 disposed in the enclosed vapor space 6 just above the surface of the body of liquid fuel. A pump 70 is provided to convey a stream of fuel through line 66 and out nozzle 68. The spray of fuel emanating from nozzle 68 agitates the body of fuel in the fuel chamber, thereby promoting vaporization and providing sufficient fuel vapors to start engine 40. Other agitating means might also be utilized. Spray nozzle 68 should be positioned far enough beneath fuel chamber inlet 18 and outlet 20 that fuel droplets will not become entrained in the air stream passing through the fuel chamber.

Fuel circulation line 66 is further provided with a valve 52 which also connects with an auxiliary fuel supply line 53 from the main fuel tank 54. Valve 52 is spring loaded to normally permit free flow of fuel through line 66 so that when pump 70 is activated, fuel from the lower portion of the fuel chamber is drawn into the circulation system. However, if the most volatile components of the fuel in the fuel chamber have been stripped away, valve 52 may be actuated to permit fresh fuel from the main fuel tank to be drawn into the recirculation system, thereby furnishing additional volatiles for cold starting. Also, line 53 could be connected to an auxiliary tank of volatile starting fluid instead of to the main fuel tank.

Fuel chamber 2 is also provided with means to relieve excessive pressures which may arise therein. In the illustrated embodiment, a short, broad conduit 72 is provided extending through the sidewall of fuel chamber 2. Conduit 72 is closed with a plug 74 formed of resilient material, such as rubber. At normal operating pressures, plug 74 provides a vapor-tight seal. If pressures within fuel chamber 2 rise to excessive levels, however, plug 74 will be ejected from conduit 72 to vent the chamber and release the pressure. Although for convenience of illustration only a single conduit and plug assembly has been shown in the drawing, it is referred to use two such assemblies on opposite sides of the fuel chamber. It has been found that with two such plugs, a fire ignited in the fuel chamber will be blown out as the plugs are expelled.

Mixing chamber 26 is provided with backfire relief means. Desirably, such means may take the form of a pressure-relief valve 76. If the engine backfires, the pressures generated inside the mixing chamber will be exhausted harmlessly to the atmosphere through valve 76.

Numerous modifications of the illustrated embodiment are possible. For example, check valves can be provided on line 22 and line 16 to prevent backflow of gases through the fuel chamber. The mixing chamber could be provided with one or more baffles defining a tortuous path therethrough in order to promote intimate mixing of the fuel/air mixture from line 22 and the supplemental air from line 33. The three air cleaners 12, 12' and 12" could be combined into a single unit, possibly with optional baffles defining separate sections for each system.

Importantly, in the apparatus of the invention, only fuel vapors are picked up by the air stream as it passes through the fuel chamber. No droplets of liquid fuel are entrained in the air stream. Moreover, through the principal purpose of screens 64 is to prevent passage of sparks, if a small amount of liquid were to become entrained in the air stream, it would be separated out as the air stream passed through the screen. Thus, only completely vaporized fuel is withdrawn from the fuel chamber for incorporation in the fuel/air mixture.

As a result of the complete vaporization of the fuel in the fuel/air mixture, as well as the infinite control of the richness or leanness of the mixture (fuel/air ratio) made possible by the apparatus of the invention, higher internal combustion engine operating efficiencies may be achieved. For example, in tests of a prototype embodiment in a 1972 Chevrolet Vega automobile equipped with a 140 cubic inch, four-cylinder engine under road conditions, a gasoline mileage of approximately 52 mpg has been achieved. Similarly, tests in a 1973 Chevrolet pickup truck equipped with a 350 cubic inch, eight-cylinder engine under road conditions have obtained a gasoline mileage of approximately 35 mpg. With the original conventional carburetor, this truck only achieved a gasoline mileage of approximately 14 mpg. Importantly, these improvements were achieved without any drastic decrease in vehicle performance.

The foregoing embodiment and alternatives have been described solely as an illustration of the invention. It is understood that modifications of the disclosed embodiment within the scope and spirit of the invention may occur to persons skilled in the art. Accordingly, the scope of the invention is to be determined with reference to the appended claims.

I claim:

1. Apparatus for supplying a fuel/air mixture to an internal combustion engine comprising:
   (a) a fuel chamber comprising a lower portion for containing a body of volatile liquid fuel in a substantially quiescent state and an upper portion defining an enclosed vapor space free of liquid fuel during normal operation above said body of said liquid fuel;
   (b) heating manifold means extending through said lower chamber portion for conducting hot exhaust gases therethrough in order to heat a body of volatile liquid fuel therein;
   (c) means comprising an inlet and an outlet opening directly into said enclosed vapor space for drawing an air stream through said enclosed vapor space and entraining fuel vapors in said air stream without said air stream passing through said body of liquid fuel and without liquid fuel being entrained in said air stream;
   (d) means for passing said air stream in heat exchange relation with hot exhaust gases to raise the temperature of the air stream prior to drawing the air stream through said vapor space;
   (e) means for mixing said fuel vapor-containing air stream with additional air to produce a combustible fuel/air mixture;
   (f) means for conveying said combustible fuel/air mixture to a combustion chamber of an internal combustion engine;
   (g) means for preventing entry of sparks or flame into said enclosed vapor space; and
   (h) means comprising two apertures located in opposite walls of said fuel chamber from each other, each aperture communicating between said enclosed vapor space and the ambient atmosphere, and each aperture being closed by a resilient blowout plug ejectable from said aperture if the pressure in said chamber exceeds a predetermined level.

2. Apparatus according to claim 1 further comprising filter means for filtering said air stream prior to drawing the air stream through said enclosed vapor space.

3. Apparatus according to claim 1 further comprising air filter means for filtering said additional air prior to mixing it with the fuel-containing air stream.

4. Apparatus according to claim 1 further comprising baffle means for preventing sloshing of said body of liquid fuel in said lower chamber portion.

5. Apparatus according to claim 4 wherein said baffle means comprises a matrix of honeycomb cells having open top and bottom faces.

6. Apparatus according to claim 1 further comprising means for controlling the rate of flow of said combustible fuel/air mixture into said combustion chamber.

7. Apparatus according to claim 1 wherein said lower chamber portion comprises the principal fuel tank for said internal combustion engine.

8. Apparatus according to claim 1 further comprising means for supplying a body of volatile liquid fuel to said lower chamber portion.

9. Apparatus according to claim 8 wherein said supply means comprises a fuel tank, a fuel line leading from said tank to said lower chamber portion, pump means for conveying fuel through said fuel line, and a float-operated valve at the outlet of said fuel line into said lower chamber portion for maintaining a constant fuel level in said lower chamber portion.

10. Apparatus according to claim 1 wherein said heating manifold means comprises a network of parallel conduits extending through said lower chamber portion.

11. Apparatus according to claim 1 wherein said spark entry preventing means comprise fine metal mesh screens interposed in the path of said air stream.

12. Apparatus according to claim 1 further comprising fin means on the exterior of said heating manifold means for enhancing the transfer of heat from said hot exhaust gases to said body of liquid fuel.

13. Apparatus according to claim 1 further comprising screen means for preventing sparks or flame from entering said mixing means.

14. Apparatus according to claim 13 further comprising backfire relief means on said mixing means.

15. Apparatus according to claim 14 wherein said backfire relief means comprises a pressure relief valve communicating between the interior of said mixing means and the ambient atmosphere.

16. Apparatus according to claim 1 further comprising means for controlling the amount of additional air which is mixed with said fuel vapor-containing air stream.

17. Apparatus according to claim 16 wherein said amount-controlling means is manually operated.

18. Apparatus for supplying a fuel/air mixture to an internal combustion engine comprising:
   (a) a fuel chamber comprising a lower portion for containing a body of volatile liquid fuel and an upper portion defining an enclosed vapor space above said body of liquid fuel;
   (b) heating manifold means extending through said lower chamber portion for conducting hot exhaust gases therethrough in order to heat a body of volatile liquid fuel therein;
   (c) means comprising an inlet and an outlet opening directly into said enclosed vapor space for drawing an air stream through said enclosed vapor space and entraining fuel vapors in said air stream without said air stream passing through said body of liquid fuel;
   (d) means for passing said air stream in heat exchange relation with hot exhaust gases to raise the temperature of the air stream prior to drawing the air stream through said vapor space;
   (e) means for mixing said fuel vapor-containing air stream with additional air to produce a combustible fuel/air mixture;
   (f) means for conveying said combustible fuel/air mixture to a combustion chamber of an internal combustion engine; and
   (g) means for selectively permitting a portion of said hot air stream to bypass said fuel chamber in order to produce a leaner fuel/air mixture.

19. Apparatus according to claim 18 wherein said bypass permitting means is activated by a vacuum valve responsive to decreases in the pressure in the outlet line of the fuel chamber.

20. Apparatus for supplying a fuel/air mixture to an internal combustion engine comprising:
   (a) a fuel chamber comprising a lower portion for containing a body of volatile liquid fuel and an upper portion defining an enclosed vapor space above said body of liquid fuel;

(b) heating manifold means extending through said lower chamber portion for conducting hot exhaust gases therethrough in order to heat a body of volatile liquid fuel therein;

(c) means comprising an inlet and an outlet opening directly into said enclosed vapor space for drawing an air stream through said enclosed vapor space and entraining fuel vapors in said air stream without said air stream passing through said body of liquid fuel;

(d) means for passing said air stream in heat exchange relation with hot exhaust gases to raise the temperature of the air stream prior to drawing the air stream through said vapor space;

(e) means for mixing said fuel vapor-containing air stream with additional air to produce a combustible fuel/air mixture;

(f) means for conveying said combustible fuel/air mixture to a combustion chamber of an internal combustion engine; and (g) means for sensing the temperature of said body of liquid fuel in said lower chamber portion and a thermal valve operable in response to the measured temperature to increase or decrease the amount of hot exhaust gases passing through said heating manifold in order to maintain the temperature of said body of liquid fuel between about 70° F. and about 95° F. during operation of the engine.

21. Apparatus according to claim 20 wherein the temperature of said body of liquid fuel is maintained between about 80° F. and about 85° F.

22. Apparatus for supplying a fuel/air mixture to an internal combustion engine comprising:

(a) a fuel chamber comprising a lower portion for containing a body of volatile liquid fuel and an upper portion defining an enclosed vapor space above said body of liquid fuel;

(b) heating manifold means extending through said lower chamber portion for conducting hot exhaust gases therethrough in order to heat a body of volatile liquid fuel therein;

(c) means comprising an inlet and an outlet opening directly into said enclosed vapor space for drawing an air stream through said enclosed vapor space and entraining fuel vapors in said air stream without said air stream passing through said body of liquid fuel;

(d) means for passing said air stream in heat exchange relation with hot exhaust gases to raise the temperature of the air stream prior to drawing the air stream through said vapor space;

(e) means for mixing said fuel vapor-containing air stream with additional air to produce a combustible fuel/air mixture;

(f) means for conveying said combustible fuel/air mixture to a combustion chamber of an internal combustion engine; and (g) means for measuring the temperature of said air stream prior to entry into said fuel chamber and thermal valve means responsive to the measured temperature for selectively admixing ambient air with the hot air passed in heat exchange relation with the hot exhaust gases in order to control the temperature of the air stream.

23. Apparatus according to claim 22 wherein the temperature of said air stream entering said enclosed vapor space is maintained at between about 70° F. and about 105° F. during operation of said engine.

24. Apparatus according to claim 23 wherein the temperature of said air stream is maintained between about 75° F. and about 90° F.

* * * * *